US012737538B2

(12) United States Patent
Roten

(10) Patent No.: US 12,737,538 B2
(45) Date of Patent: Sep. 15, 2026

(54) DETECTION OF ARTIFICIAL AUTHORS

(71) Applicant: Claude-Alain Roten, Vevey (CH)

(72) Inventor: Claude-Alain Roten, Vevey (CH)

( * ) Notice: Subject to any disclaimer, the term of this patent is extended or adjusted under 35 U.S.C. 154(b) by 119 days.

(21) Appl. No.: 18/924,625

(22) Filed: Oct. 23, 2024

(65) Prior Publication Data

US 2025/0131193 A1 Apr. 24, 2025

(30) Foreign Application Priority Data

Oct. 24, 2023 (CH) .............................. 001181/2023

(51) Int. Cl.
*G06F 40/20* (2020.01)

(52) U.S. Cl.
CPC .................................. *G06F 40/20* (2020.01)

(58) Field of Classification Search
CPC ...... G06F 40/20; G06F 40/216; G06F 40/253; G06F 40/284; G06F 16/353
See application file for complete search history.

(56) References Cited

U.S. PATENT DOCUMENTS 12,238,322 B2 * 2/2025 Luo ........................ H04N 19/44
12,321,831 B1 * 6/2025 Karpman ............... G06N 20/00
2019/0050388 A1 2/2019 Myriam et al.
2021/0174017 A1 6/2021 Genilloud et al.
2021/0390447 A1 * 12/2021 Cheruvu ................ G06N 20/00
2024/0296288 A1 * 9/2024 Bitton ..................... G06F 40/30
2024/0331707 A1 * 10/2024 Siekman ................ G10L 17/24
2024/0406003 A1 * 12/2024 Murialdo ............. H04L 9/3247

FOREIGN PATENT DOCUMENTS

WO 2008036059 A1 3/2008
WO 2017144939 A1 8/2017

OTHER PUBLICATIONS

Keerthichowdary, Naive Bayes Classification | DetectAI-Generated Text, Dec. 2, 2023, Medium, All pages.*
Swiss Search Report Issued in Corresponding Swiss Patent Application No. CH001181/2023, dated Jun. 14, 2024, 5 pages.
Roten et al. "Detecter par stylometrie la fraude academique utilisant ChatGPT", Cahiers IRAFPA, vol. 1, No. 1, Jul. 14, 2023, 11 pages, Accessed via Internet URL: https://cahiers.irafpa.org/article/view/4126/3703.
Bozza et al., "A model independent redundancy measure for human versus ChatGPT authorship discrimination using a Bayesian probabilistic approach", Scientific Reports, vol. 13, No. 1, Nov. 6, 2023, 8 pages, Accessed via Internet URL: https://www.nature.com/articles/s41598-023-46390-8.
Anonymous, "GPTZero Wikipedia," Oct. 22, 2023, 5 pages, Accessed via Internet URL: https://en.wikipedia.org/wiki/GPTZero.

(Continued)

*Primary Examiner* — Michael Colucci
(74) *Attorney, Agent, or Firm* — BLANK ROME LLP

(57) ABSTRACT

A computer implemented method for determining if a questioned text has been produced by a human or by a generative artificial intelligence based conversational agent. The method includes the steps of: retrieving from the test text a feature (y) representing the redundancy of the test text; using this feature for determining if the test text has been produced by a human or by a generative artificial intelligence based conversational agent.

18 Claims, 5 Drawing Sheets

| BF | $H_1$ (*Krugman*) | $H_2$ (*ChatGPT*) |
|---|---|---|
| $< 10^{10}$ | 0 | 0 |
| $10^{-10} - 10^{-5}$ | 0 | 2 |
| $10^{-5} - 10^{-4}$ | 0 | 0 |
| $10^{-4} - 10^{-3}$ | 0 | 1 |
| $10^{-3} - 10^{-2}$ | 0 | 0 |
| $10^{-2} - 10^{-1}$ | 0 | 2 |
| $10^{-1} - 1$ | 0 | 0 |
| $1 - 10$ | 3 | 0 |
| $10 - 10^2$ | 2 | 0 |
| $> 10^2$ | 0 | 0 |
| BF > 1 | 5 | 0 |
| BF < 1 | 0 | 5 |

(56) References Cited

OTHER PUBLICATIONS

Gehrmann et al., "GLTR: Statistical Detection and Visualization of Generated Text," Jun. 10, 2019, 6 pages, Accessed via Internet URL: https://aclanthology.org/P19-3019.pdf.
Badaskar et al., "Identifying Real or Fake Articles: Towards better Language Modeling," Third International Joint Conference On Natural Language Processing, Jan. 7, 2008, 6 pages, Accessed via Internet URL: https://aclanthology.org/108-2115.pdf.
Anonymous, "Stylometry Wikipedia," Oct. 17, 2023, 17 pages, Accessed via Internet URL: https://en.wikipedia.org/wiki/Stylometry.

* cited by examiner

| BF | $H_1$ (*Human*) | | | | $H_2$ (*ChatGPT*) | | | |
|---|---|---|---|---|---|---|---|---|
| | FSI | | Students | | FSI | | Students | |
| | B | M | B | M | B | M | B | M |
| $10^{-8}$ – $10^{-7}$ | 0 | 0 | 0 | 0 | 0 | 0 | 0 | 2 |
| $10^{-7}$ – $10^{-6}$ | 0 | 0 | 0 | 0 | 0 | 2 | 0 | 6 |
| $10^{-6}$ – $10^{-5}$ | 0 | 0 | 0 | 0 | 0 | 7 | 0 | 14 |
| $10^{-5}$ – $10^{-4}$ | 0 | 0 | 0 | 0 | 0 | 9 | 0 | 8 |
| $10^{-4}$ – $10^{-3}$ | 0 | 0 | 0 | 0 | 0 | 5 | 0 | 9 |
| $10^{-3}$ – $10^{-2}$ | 0 | 0 | 0 | 0 | 0 | 9 | 0 | 6 |
| $10^{-2}$ – $10^{-1}$ | **1** | 0 | 0 | 0 | 22 | 2 | 26 | 3 |
| $10^{-1}$ – 1 | **5** | **2** | **10** | 0 | 13 | 2 | 16 | 0 |
| 1 – 10 | 15 | 1 | 22 | 3 | **2** | 0 | **7** | **1** |
| 10 – $10^2$ | 18 | 3 | 22 | 1 | 0 | **1** | 0 | 0 |
| $10^2$ – $10^3$ | 16 | 4 | 18 | 6 | 0 | 0 | 0 | 0 |
| $10^3$ – $10^4$ | 2 | 4 | 0 | 6 | 0 | 0 | 0 | 0 |
| $10^4$ – $10^5$ | 0 | 8 | 0 | 9 | 0 | 0 | 0 | 0 |
| $10^5$ – $10^6$ | 0 | 7 | 0 | 20 | 0 | 0 | 0 | 0 |
| $10^6$ – $10^7$ | 0 | 11 | 0 | 11 | 0 | 0 | 0 | 0 |
| $10^7$ – $10^8$ | 0 | 4 | 0 | 9 | 0 | 0 | 0 | 0 |
| $10^8$ – $10^9$ | 0 | 6 | 0 | 3 | 0 | 0 | 0 | 0 |
| $10^9$ – $10^{10}$ | 0 | 7 | 0 | 4 | 0 | 0 | 0 | 0 |
| BF > 1 | 51 | 55 | 62 | 72 | **2** | **1** | **7** | **1** |
| BF < 1 | **6** | **2** | **10** | 0 | 35 | 36 | 42 | 48 |
| Misclassification rate | 0.10 | 0.03 | 0.14 | 0.00 | 0.05 | 0.03 | 0.14 | 0.02 |

| BF | $H_1$ (Krugman) | $H_2$ (ChatGPT) |
|---|---|---|
| $< 10^{10}$ | 0 | 0 |
| $10^{-10} - 10^{-5}$ | 0 | 2 |
| $10^{-5} - 10^{-4}$ | 0 | 0 |
| $10^{-4} - 10^{-3}$ | 0 | 1 |
| $10^{-3} - 10^{-2}$ | 0 | 0 |
| $10^{-2} - 10^{-1}$ | 0 | 2 |
| $10^{-1} - 1$ | 0 | 0 |
| $1 - 10$ | 3 | 0 |
| $10 - 10^2$ | 2 | 0 |
| $> 10^2$ | 0 | 0 |
| BF > 1 | 5 | 0 |
| BF < 1 | 0 | 5 |

DETECTION OF ARTIFICIAL AUTHORS

CROSS-REFERENCE TO THE RELATED APPLICATIONS

This application is claims the benefit of priority of Swiss Patent Application Ser. No. CH001181/2023, filed on Oct. 24, 2023. The entire content of this application is hereby incorporated by reference.

TECHNICAL DOMAIN

The present invention concerns a computer implemented method adapted to determine the human authorship. In particular the present method is adapted to discriminate texts generated by an artificial intelligence and human texts. The present method further allows to identified text written by a human with the assistance of an artificial intelligence.

RELATED ART

Generative artificial intelligence (GenAI) is a type of Artificial Intelligence that can generate a wide variety of documents, such as texts, images, videos, etc. GenAI programs can learn patterns from existing training data, and use this knowledge to generate new and unique outputs.

This technical area has developed rapidly recently. As an example, the public discovered at the end of 2022, the use of OpenAI's chatbox ChatGPT (Generative Pre-trained Transformer). This conversational agent generate utterances from a user's question by selecting the most likely terms observed in short strings of words from training texts. It makes it appear that an artificial intelligence (AI) is participating in a conversation. Other similar tools appeared, including Bard developed by Google.

By writing using probable semantics, ChatGPT, Bard and similar GenAI based conversational agents understand neither the meaning of the training texts nor the meaning of the messages it produces. Their copywriting strategy mimics the consensus style of training texts, but is not calibrated to produce original relevant responses. Nowadays, those agents only serve to produce credible style text.

If GenAI based conversational agents meet some legitimate needs of a user such as sketching a draft or summarizing a text, they can also be used in an unwanted or even fraudulent manner: e.g. producing unreliable documents, including fake news, writing anonymous criminal letters for a cyberattack for example, answering for a candidate to an academic exam or writing a certifying document in his place.

The controversy over the authorship of texts published not only in scientific journals but also in publications ranging from legal or social to psychological or medical themes is increasingly topical. The academic world, too, is on the alert because it seems to find itself lacking a valid support for investigating the authorship of texts potentially drafted with the help of a generative artificial intelligence, or as a full substitute for text editing. The judicial community is also alarmed with reference to sided copyright issues.

Style implies a set of quantifiable characteristics determined by the syntax of a text, known as stylometric features and specific to each person. Authorship attribution based on stylometric features is well known, and described for example in WO2008/036059. This document describes an authorship attribution method that relies on stylometric variables, including word length, sentence length, paragraph length, counts of short words, and such. WO2017/144939 expands the method by using low level stylometric features, such as N-grams, i.e., groups of N symbols. Both documents suggest a method for detecting or verifying authorship by comparing the stylometric features of one test document to attribute with known stylometric features of one or a plurality of authors.

The detection whether a test text has been generated by a human or by a conversational agent based on generative AI could thus be based on analysing stylometric features of the conversational agent, and comparing the stylometric features of a test document with those known features. If the stylometric features are similar, then it is likely that the text has been generated by a conversational agent; if they differ, it is more likely that the text has been produced by a human.

Since GenAI based conversational agents only generate texts based on pre-existing training texts, the texts they produce are likely to have stylometric features similar to those training texts, i.e., not very different from human generated texts. In fact, agents such as ChatGPT can be instructed to write by applying a specially defined type of style. This makes the specificity of ChatGPT's style nonexistent or at least difficult to discriminate from that of a specific category of human beings. This approach might thus only work with some GenAI based conversational agents, but not with all agents.

However, while a human writer will maintain his own personal style along the text, a GenAI based agent might generate texts whose style vary within the document, being based on training portions from different writers. Therefore, a high variability of the stylometric features within one single document might be a strong indication that the text was generated by an artificial intelligence.

The question of main interest is whether it is possible to discriminate—or at least highlight a trend on—a text authored by a human from a text, on the same scientific or social subject, written by ChatGPT regardless of the model used by this AI media to reproduce human handwriting. This challenge is reminiscent of a series of scientific events on digital text analysis held in 2019, where identifying tweets written by humans or bots with malicious intent was one of the objectives. The scientific publication titled "*detecter par stylométrie la fraude académique utilisant ChatGPT*», from Claude-Alain Roten et al. (2023), and the scientific publication titled «GLTR: statistical detection and visualisation of generated text" Sebastian Gehrmann et al. (2019), provide general guidance to this topic. There is however room for improvement.

Fraudulent and unwanted uses of GenAI based AI conversational agents based on generative AI require the ability to detect automatic texting.

An aim of the present invention is the provision of a computer implemented method that detects if a test text has been generated by a human or by a conversational agent based on generative AI.

This problem is solved with the method recited in claim 1.

The computer implemented method is thus based on a combination of at least the following two strategies for detecting if a text has been generated by a human or by a GenAI based conversational agent.

Stylometric features; and

Redundancy

The stylometric features relate to various elementary linguistic units, which are related to, or defined by, Bayes factors. This allows to detect, identify and/or characterize significant stylometric features, including those which would not have been considered initially. More than known or usual candidate stylometric features can thus be detected.

In addition, the redundancy allows to differentiate the texts originating from an artificial intelligence from texts originating from human creativity. The redundancy is evaluated based on the above-mentioned stylometric features.

According to an important aspect, the redundancy can be further evaluated and/or validated based on the Bayes factors. This allows to provide accurate and reliable analysis.

According to an aspect, the punctuation signs can be used to define some stylometric features, in relation to corresponding Bayes factors. The punctuation signs usually participate to the complexity of the text and can improve the accuracy of the present analysis. In particular, the complexity of a text produced by an artificial source differs from the one of a human writer. The degree of complexity, based on the punctuation signs analysis can further be related to Bayes factors so as to quantify the results of the stylometric feature detection.

The present method thus comprises the steps of:

- considering the redundancy of at least some stylometric features;
- Determining the more accurate stylometric features allowing to differentiate human and artificial texts. According to an aspect the most relevant stylometric features comprise words, word N-Grams, pattern N-grams of characters, word length N-grams. According to an aspect, the more accurate stylometric features are selected among the less used stylometric features, that is to said of rare or medium usage, both for the human and for the artificial test texts. Such a selection is object of calibration and/or adjustments. It can be performed by a suitable statistical method. Preferably, the Zeta method is used as such and properly calibrated. According to an aspect, the performance of the statistical method used to this end can also be evaluated by Bayes factors.
- Evaluating accuracy and/or performance of one or more of the original stylometric features, the redundancy of such stylometric features and the statistical method used to differentiate the human and the artificial texts. Preferably, all these elements are evaluated so as to produce a more accurate analysis. Such an evaluation is preferably performed based on Bayes factors.
- Comparison of a test text with at least one text known to be written by a human, a so called reference human text. Preferably, a human reference text is selected among texts effectively written by an identified human candidate who is also author of the test text under evaluation. Such a reference human text can also comprise several texts written by the candidate. The human reference text can however define one or several texts from an unknown human writer or from a group of several unknown human writers. This step allows to determine if the test text is entirely created by the human candidate under evaluation or if it has benefited from the assistance of an artificial intelligence.

BRIEF SUMMARY OF FIGURES

The present invention is better described with the following figures.

DETAILED DESCRIPTION

Stylometric Features

Figure 1:
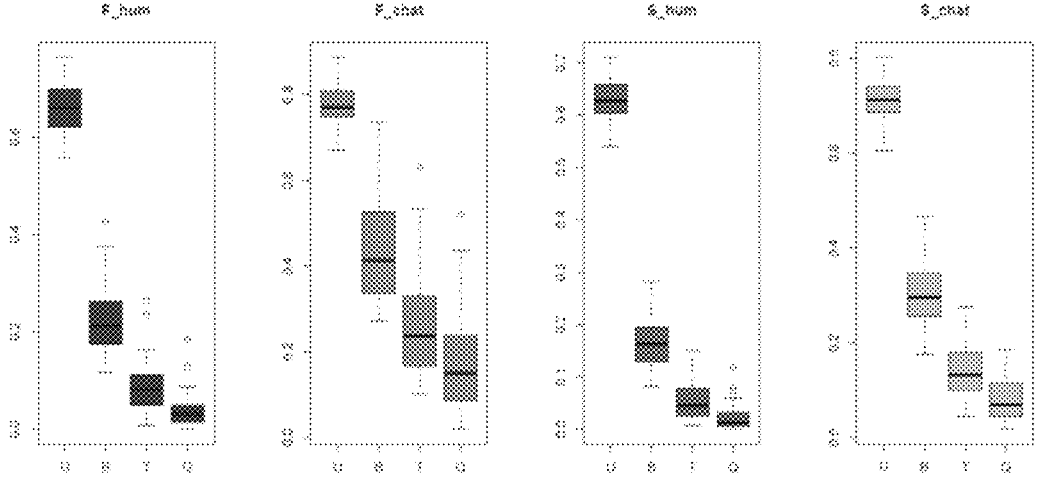
FIG. 1: graph representation of exemplified stylometric features used in four populations and used in the present analytical method from the left to the right: forensic science papers written by human experts F_hum, a forensic science papers written by ChatGPT F_chat, texts written by students on sociopsycho-artistic topics S_hum and texts written by ChatGPT S_chat on sociopsycho-artistic topics.

Stylometric features comprise words, word N-Grams, pattern N-grams of characters, word length N-grams.

Words denote any structure of characters limited by a space or a punctuation sign. In other words, it denotes groups of signs except punctuation signs. The signs can thus be letters forming a word.

Word N-Grams denote groups of words, wherein the words are defined as above. As such, in the sentence «To be or not to be» the following 5 word bibrams can be defined: to be; be or; or not; not to; to be.

Pattern N-gram of characters denote cluster of patterns wherein the patterns include any character, punctuation sign and space. As such, in the sentence «To be or not to be» the following 7 first bigram of characters can be defined: to; o_; _b; be; e_; _o; or; . . . .

Word length N-grams denote the number of characters present in a given word wherein a given word is as defined above. As such, the sentence "To_be_or_not_to_be" comprises the following word lengths "2 2 2 3 2 2". The 5 following word length bigrams of this sentence 2_2; 2_2: 2_3; 3_2; 2_2; 2_2 can thus be defined.

Other feature N-grams can be determined according to the needs. In particular punctuation N-grams can be defined regarding exclusively the series of punctions signs.

Redundancy

Vocabulary richness, defined as vocabulary amplitude, is a marker of lexical features that can aid stylistic analysis. GenAI based conversational agents usually generate texts similar to the training texts, by choosing the most probable neighbouring words according to the training texts. By contrast, a human writer writes his text by organizing his arguments without constraint of choice of words. A human text will therefore be written with a greater freedom of word choice than a GenAI based text. Detecting the degree of freedom in the choice of words in a test text thus provides another indication as to whether the text was generated by an AI.

The above-mentioned feature N-grams, including word, word N-grams, Pattern N-gram of characters, Word length N-grams, can be used to characterize a measure of singularity related to redundancy phenomena appearing in a written text. Such a measure of singularity is independent of the model used to produce it, that is to say the corresponding algorithm or group of algorithms. In this respect, the syntax in texts authored by humans tends to differ from those characterizing texts produced by ChatGPT or a related artificial program, which is less rich in vocabulary than the human one. This aspect makes this AI text more constraining on its knowledge.

Analyses of feature N-grams have been summarized by a singularity measure related to their unique presence in a text sequence. An absence, or at least a limitation, of redundancy in feature N-grams supports the idea that a rich and extensive vocabulary is adopted. This singularity measure allows the characterization of a document by means of the systematic identification of a pattern used within and between words and sentences, respectively.

The stylometric profile of texts of known authors allows one to rule quantitatively on such texts to tackle the problem of authorship and characterize populations. According to an embodiment, Redundancy measures can be calculated taking into account different sizes of word N-grams, notably uni-, bi-, tri- and quadri-grams, comprising respectively 1, 2, 3 and 4 words. Collected data are presented in FIG. 1, wherein U denotes a word uni-gram, B denotes word Bi-grams, T denotes word Tri-grams, and Q denotes word quadri grams. Four populations are here analysed, including a forensic science papers written by human experts F_hum, a forensic science papers written by ChatGPT F_chat, texts written by students S_hum and texts written by ChatGPT S_chat on sociopsycho-artistic topics. The forensic science papers of the two first populations are written in English. The texts on the sociopsycho-artistic topics of the two last populations are written in French.

FIG. 1 shows that the texts written by a human being have less redundancy than the corresponding texts provided by the AI program.

A style marker can be quantified through the singularity or redundancy measures on words. Such a style marker can be used in association with a probabilistic approach to assess its contribution for supporting authorship hypothesis, as better described below The Bayes factor (BF) is defined by equation E1 below. Denote, for sake of simplicity, by letters H1 and H2 the hypotheses of interest, say H1, the author of a given questioned document is a human individual, and H2, the author of a given questioned document is a GenAI-based conversational agent, and denote by y the redundancy measure, also called the evidence. This evidence evaluation is achieved through the assignment of a Bayes factor (BF for short), which provides a coherent measure of the degree to which the evidence can discriminate between the different hypotheses.

$$BF = \frac{f(y \mid H_1)}{f(y \mid H_2)}. \qquad \text{E1}$$

Bayes factor value is non-negative with no upper bound. A value greater than one provides support for the hypothesis H1 (over H2), and a value less than one favors the alternative hypothesis H2 (over H1). Evidence for which the value is one is neutral in that the evidence does not discriminate between the two propositions of interest.

After opportune mathematical transformation, measurements exhibit enough regularity for standard Normal parametric models to be used, $f(y|\theta,\sigma^2)$. A conjugate Normal-inverse-Gamma distribution is fitted for population parameters $(\theta,\sigma^2)$, and the marginal likelihoods at the numerator and denominator of the Bayes factor in the above equation E1 can be obtained analytically according to equation E2 below:

$$f(y \mid H) = \int f(y \mid \theta, \sigma^2) f(\theta, \sigma^2) d(\theta, \sigma^2). \qquad \text{E2}$$

It can be proved this is a Student-t distribution centered at the prior mean μ with spread parameter s defined by equation E3 below with 2α degrees of freedom St(μ, s, 2α):

$$S = \frac{n_0 n}{n_0 + n} \alpha \beta^{-1} \qquad \text{E3}$$

It might be of interest to retain all available feature N-grams and test the respective support offered to competing hypotheses H1 and H2 whenever jointly considered. The previous statistical model can therefore be extended accordingly to handle multivariate data, since the multivariate data Normal distribution shows a good fit to the available measurements. The prior choice falls now into the conjugate into a Normal-inverse-Wishart prior distribution. The marginal likelihood can again be obtained analytically, and turns out to be a multivariate Student-t distribution.

Figure 2:
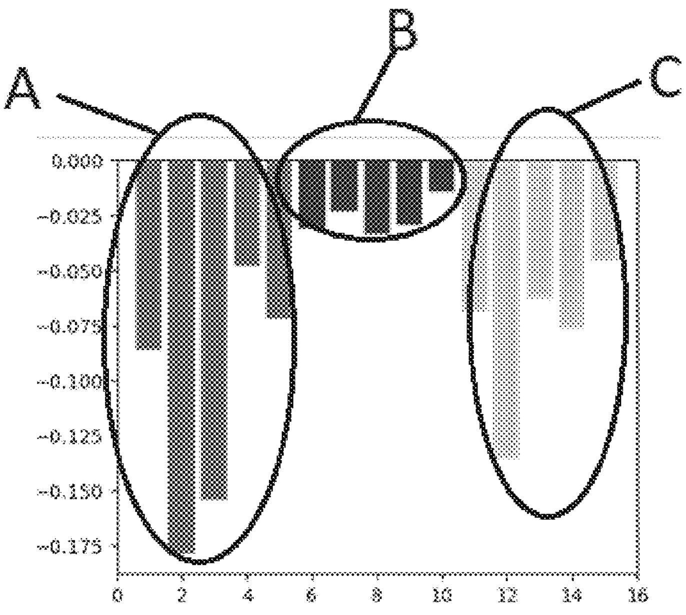
FIG. 2: Graphical representation of groups of texts identified to be created by a human or by an artificial intelligence, based on vocabulary redundancy. Group A: 5 economic articles written by ChatGPT, group B: 5 economic articles from a newspaper columnist. Group C: 5 historical articles produced by ChatGPT.

Obtained by Machine Learning, FIG. 2 illustrates how to detect Gen-AI produced texts. The length of the bars is proportional to the vocabulary constraints. Groups A, B and C shown in FIG. 2 relates to the following types of documents. A refers to 5 economic articles written by ChatGPT. B relates to 5 economic articles from a newspaper columnist. C relates to 5 historical articles produced by ChatGPT. The results are obtained based on articles of about 3000 signs, which corresponds to a little less than a full page of MS-Word text corresponding to about 500 tokens. The 5 texts of the columnist of the group B are of a freer semantic choice than the texts of ChatGPT provided in the groups A and C. The corresponding bars are longer. The greater restriction of semantic choice in ChatGPT is of the same order in groups A and C, whether the theme is economic or historical. The example thus illustrates the significant difference in the degree of freedom in the choice of words: great freedom for a writer, constrained freedom for Gen-AI produced texts.

This detection technique better works on texts with a minimum target size of half a page (about 250 tokens).

Examples of Embodiments of the Present Invention

The invention takes advantage of an original measure, the redundancy value, for authorship purposes. This value has been studied and its performance in investigative settings (i.e. source classification) was compared to results adopting various feature N-grams in a uni- and multi-variate format. The analyses by bi-grams offers one of the best classification rate results to discriminate between human and ChatGPT texts.

It can be shown that results are topic- and language-independent. The Bayesian modeling approach offers a logical framework through the use of the Bayes factor as decisional criterion.

An alternative scenario, advantageous in a case of a small amount of background information, has also been analyzed in order to study the performance of the proposed probabilistic approach under such extreme conditions, which may nevertheless correspond to the daily work of a forensic expert. Stylometric and probabilistic approaches here allow to address the issues related to authorship.

To study the distribution of the Bayes factor values obtained using texts of known sources, either human or artificial, selected from available material, a leave-one-out method has been used, while the remaining data are used to elicit model parameters. To test hypothesis H1, wherein the putative source is human, a Bayes factor is calculated for measurements originating from each text having a human source. To test hypothesis H2, wherein the putative source is ChatGPT, a Bayes factor is calculated for measurements originating from each text having an artificial source. All Feature N-grams are analyzed, either separately, either jointly, by means of univariate or multivariate models. The best performance is achieved whenever all N-grams are retained.

Figures 3, 4A:
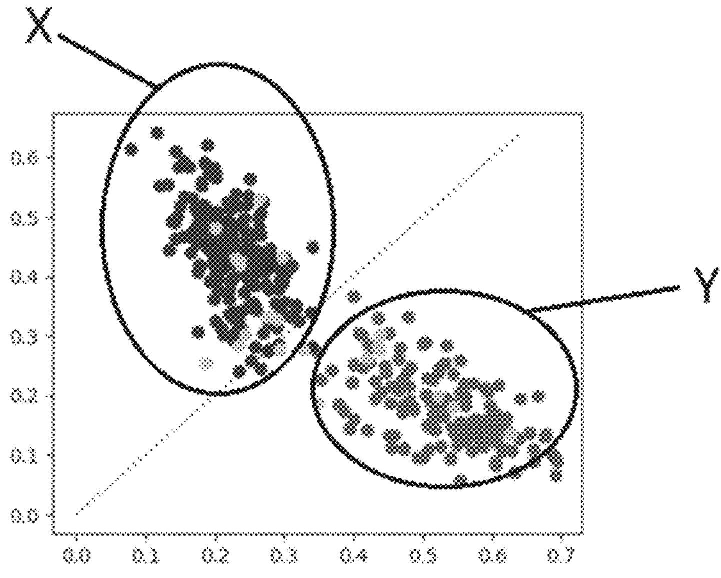
FIG. 3: Representation of the assessment of the probabilistic approach used in the present invention to discriminate a text based on human (H1) and an artificial intelligence (H2). For each case, B denotes bi-grams and M denotes all N-grams.
FIG. 4*a*: graphical representation of the Zeta measurement of a target of 1000 characters analysed based on a text of about 2000 characters. X denotes 70 original reference human text and 5 questioned human texts of reference. Y denotes 70 original reference artificial text and 5 questioned artificial texts of reference, produced by ChatGPT. Abscissa: 20% more discriminant artificial texts, ordinate: 20% of the most discriminant human texts.

FIG. 3 shows BF values for cases where bi-grams (B) or all N-grams (M) are considered for each one of human and artificial text category. It further comprises the total number of cases where Bayes factor values support the correct hypothesis, that is BF>1 when H1 is true and BF<1 when H2 is true. It further highlights the total number of cases where the wrong hypothesis is supported by the Bayes values.

This demonstrates that only a small number of false positive and false negative responses are provided. In particular, the Bayes factors giving rise to false results have a modest amplitude. They are mainly located in the interval ($10^{-1}$-1) whenever H1 is true and a value greater than 1 is expected, and in the interval (1-10) whenever H2 is true and a value lower than 1 is expected. The support provided by values of this magnitude is generally considered weak. The support related to the Bayes factors is determined according to the known six point verbal scale comprising the terms “weak”, “moderate”, “moderately strong”, “strong”, “very strong” and “extremely strong”. This scale is explicated for example in the publication Sci.&Justice 56, 364-370 (2016) from Marqui et al. The best performance is obtained with the multivariate model (M), which take into account the complexity of texts styles to an extend that cannot be capture by a single variable.

Figure 5A:
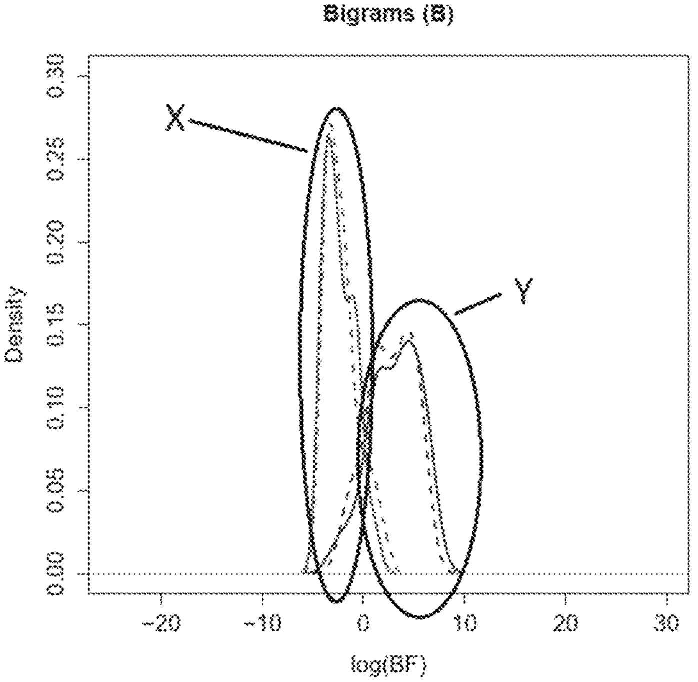
FIG. 5*a*: Graphical representation of the weight of evidence based on bigrams (log(BF)) for every texts written by ChatGPT on forensic (Solid line of X and Y group) and socia-psycho-artistic terms (dashed line of group X and Y) and for every texts written by human scientists on forensic (Solid line of X and Y group) and student (dashed line of group X and Y).
Figures 5B, 6:
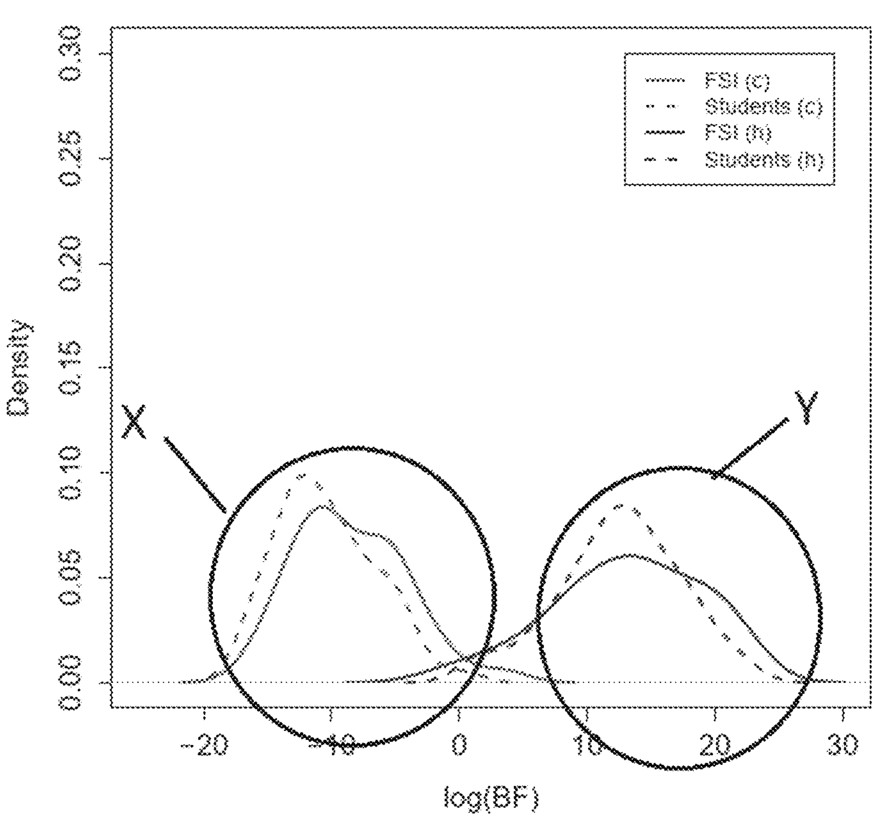
FIG. 5*b*: Graphical representation of the weight of evidence based on all N-grams (log(BF)) for every texts written by ChatGPT on forensic (Solid line of X and Y group) and socia-psycho-artistic terms (dashed line of group X and Y) and for every texts written by human scientists on forensic (Solid line of X and Y group) and student (dashed line of group X and Y).
FIG. 6: Representation of the assessment of the performances of the probabilistic approach for author discrimination according to an example of the present invention when the putative source is a human beings (H1) or ChatGPT (H2). The results are reported for cases where only bigram (B) are considered.

FIGS. 5*a* and 5*b* shows the weight of evidence (log(BF)) for every texts written by ChatGPT on forensic and socia-psycho-artistic terms, in one hand and for texts written by scientists and student in the other hand. A distinction is made between so called scientific articles (FSI) represented by solid line and so called student texts related to socio-psycho-artistic topics, represented by the dash lines. The X group represents texts delivered by ChatGPT and the Y group those delivered by human beings. The representation of FIG. 5*a* supports the suitability of the present model for author discrimination. In addition it meets the need encountered in practice when large databases are no necessarily available.

The nearly superposition of the distribution of the Bayes factor values for the solid and dash lines highlight the absence, in term of topic influence between texts written by human and by ChatGPT whenever such measure or redundancy is employed. A scientific forensic paper is not distinguished from a text on socio-psycho-artistic topics. Furthermore, superposition also shows that the language, French or English, does not influence the result.

According to an aspect, the classification step can be formulated as a decision problem. Parameter d1 can represent the decision of classifying a questioned text as being written by a human being. The parameter d2 can represent the decision of classifying a questioned text as being written by a an artificial intelligence such as ChatGPT. Parameter l1 can represent the loss that is incurred whenever decision d1 is incorrect, namely when decision d1 is taken while the hypothesis H1 is not true. Parameter l2 can represent the loss incurred when decision d2 is incorrect, namely when decision d2 is taken while the hypothesis H2 is not true.

The formal Bayesian decision criterion is to calculate the expected loss for each decision d1, d2 and decide d1 if it gives rise to a smaller loss, or d2 if it give rise to a smaller loss. Such method represent a coherent classification procedure since it minimizes the probability of misclassification. According to an aspect, equal prior probabilities for the hypotheses of interest is assessed, namely Pr(H1)=Pr(H2). According to another aspect, symmetrical loss function is chosen, namely l1=l2. That is to say that adverse decision outcomes are equally undesirable. It results that d1 is decided whenever the byes factor values is greater than 1 and d2 is decided whenever Bayes factor values are smaller than 1.

Alternatively, falsely classifying a text written by an artificial intelligence may be regarded more severely than falsely classifying a text as a written by a human. This is particularly true for identifying texts for which author have benefited from an artificial assistance where he is expected to have written the text by himself. l2 may taken larger than l1 by a given factor, such as 5, 10 or 100 greater than l1. For example, l2=10×l1. This means that falsely classifying a text as written by an artificial intelligence is considered ten times as serious as the opposite. An asymmetric loss function can thus be used. Alternatively, non equal prior probabilities concerning the competing hypothesis can be used, namely Pr(H1)≠Pr (H2) which includes that Pr(H1)>Pr (H2) or Pr(H1)<Pr (H2) according to the needs. This significantly modifies the threshold and consequently the decision d1 or d2 to take. In particular, a significant decrease of misclassification rate can be provided.

FIG. 6 shows the performance of the probabilistic approach here described for human source (hypothesis H1) and artificial intelligence source (hypothesis H2) when bi-grams are considered. No false negative (BF<1 under H1) or false positive (BF>1 under H2) are observed.

According to an embodiment, the size of the sample is limited. The forensic practice often faces to limited amount of material and comparative reference samples. The text under question can request the following hypotheses: H1 text has been written by the Nobel prize winner Paul Krugman and H2, the test text has been written by ChatGPT. In this case, a given number of texts on economic subjects written by Paul Krugmann and a given number of texts on the same economic topic generated by ChatGPT can be used to discriminate the writer Paul Krugmann from ChatGPT. For example 5 or 10 or more texts from each one of the categories can be selected. The number of considered characters of the selected texts of the human author Paul Krugmann can be predetermined. For example, the 1000, 3000 or 10 000 first characters of each text can be considered.

A redundancy measure is performed based on sequences of word N-grams.

ChatGPT text are generated using a predetermined prompt The redundancy is determined for at least some relevant stylometric features such as uni-, bi-, tri- and quadri-grams. Each one of the human reference texts and each one of the ChatGPT texts are tested regarding the hypotheses H1 and H2 and the corresponding Bayer factors are determined as above-described. FIG. 6 shows the results for bi-grams. No errors are identified, which means that the Bayes factor values always support the right hypothesis. Similar results are obtained for other N-grams.

The present method further comprises a step of evaluating the performance of the method based on the frequencies of same stylometric feature. Based on a threshold of frequency related to a given stylometric feature, two lists of units are provided. A first list comprises the stylometric features frequently used in a first group of texts, namely human generated or artificially generated texts and rarely used in the second group. The second list comprises on the contrary the stylometric features frequently used in the second group and rarely in the first one. These stylometric features thus appear as discriminant features.

A given text, or a sequence thereof, can thus be related to a Zeta value for a given stylometric feature, which defines the degree or the probability of absence or presence of such a stylometric feature in the corresponding text or sequence. The corresponding texts or sequences thereof are represented as a dot in a bidimensional graph, wherein the proportion of the stylometric features of the first style is on abscissa and wherein the proportion of the stylometric features of the second style is on the second dimension. The text of each of the group of style form a cluster.

A test text is located in one of the cluster (X, Y, FIGS. 4*a* to 4*d*) corresponding to one of the two styles, human or artificial, and is thus considered as related to the same.

Figure 4B:
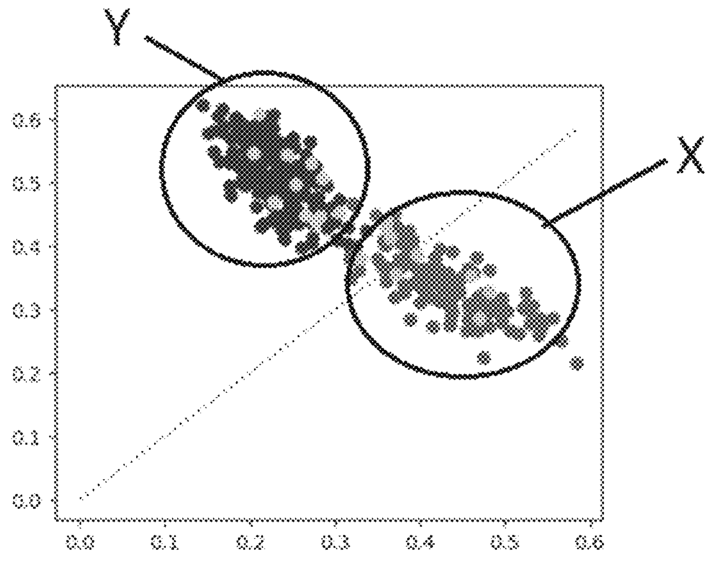
FIG. 4*b*: Graphical representation of the Zeta measurement of 4-grams of characters of a target of 1000 characters analysed based on a text of about 2000 characters. Y denotes 70 original reference human text and 5 questioned human texts of reference. X denotes 70 original reference artificial text and 5 questioned artificial texts of reference, produced by ChatGPT. Abscissa: 20% more discriminant artificial texts, ordinate: 20% of the most discriminant human texts.
Figure 4C:
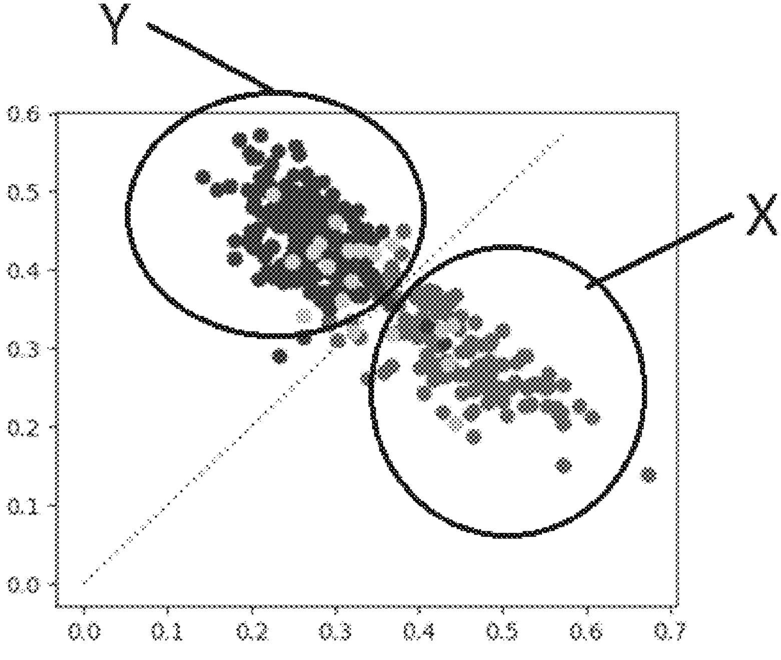
FIG. 4*c*: Graphical representation of the Zeta measurement of 3-grams of word length of a target of 1000 characters analysed based on a text of about 2000 characters. Y denotes 70 original reference human text and 5 questioned human texts of reference. X denotes 70 original reference artificial text and 5 questioned artificial texts of reference, produced by ChatGPT. Abscissa: 20% more discriminant artificial texts, ordinate: 20% of the most discriminant human texts.
Figure 4D:
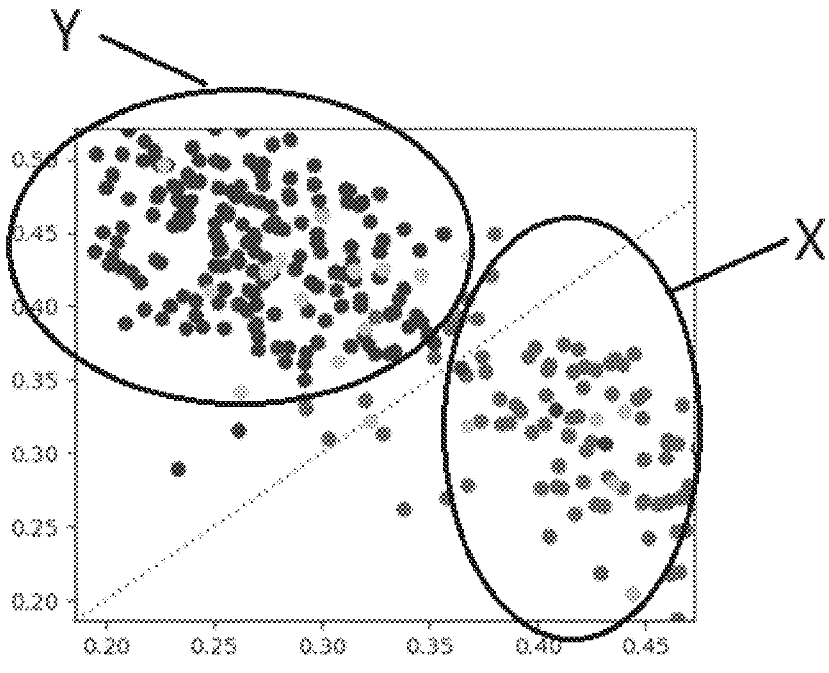
FIG. 4*d*: Enlargement of the graphical representation of FIG. 4*c* between the cluster of X and Y.

FIGS. 4*a* to 4*d* show examples of such clusters related based on 70 texts sequences discriminated in two cluster, one being related to human texts and the other one to ChatGPT texts. 5 test texts are then analysed and compared to the clusters. In FIG. 4*a*, the accuracy for analysis of the closest neighbour of 19/20 is obtained. FIG. 4*b* refers to the Zeta measurement of the 4-gram of the considered texts. Accuracy for analysis of the closest neighbour is 20/20. FIG. 4*c* refers to the Zeta measurement of the 3-gram of the considered texts. Accuracy for analysis of the closest neighbour is 20/20.

In the present method, a calibration step can be provided so as to be able to classify a test text according to its style. The calibration step can be performed for example by means of a rolling stylometry. To this end, each sequence of test texts and reference texts is represented on a histogram by a coloured bar. The colour refers to a reference style. Each sequence of test texts and reference texts is compared to texts of reference style so as to be represented in a multi-dimensional space wherein each dimension relates to the frequency of a given stylometric feature. The size of each of the bars is proportional to the normalised distance of the text to the barycenter of the closest reference texts. Based on such a calibration step, when a text having a known style is analysed, it takes the colour of the corresponding style. It is thus possible to use the present analytical method for test texts.

The present method can further comprise a step of determining the accuracy of the calibration step. The accuracy can be determined as above described for the Zeta parameters. For example the closest neighbour can be considered.

According to an aspect, when a test text, compared to the closest style, relates to several groups of texts having known styles, it is considered as comprising several different styles. As such a test text can be considered as comprising some artificial source of text if a style correspond to such artificial style.

Alternatively, accuracy of more than 90%, 95% or 97% can be obtained for texts having homogenous styles.

All steps of the present method, including the stylometric feature selection, the rolling stylometry, the stylometry based on punctuation, as well as any other stylometric features, can be validated by the Baleysian method here described.

According to an aspect, the rolling stylometry allows the perform the calibration step and the analysis concomitantly, in a single step.

The various features of the present invention can thus be defined as follows, either independently or combined:

The present method is a computer implemented method for determining if a test text has been produced by a human or by a generative artificial intelligence based conversational agent, comprising the step of:

- retrieving from the test text a feature (y) representing the redundancy of the test text;
- using this feature for determining if the test text has been produced by a human or by a generative artificial intelligence based conversational agent.

The present method comprises the step of computing a Bayes factor (BF)

$$BF = \frac{f(y \mid H_1)}{f(y \mid H_2)}.$$

where $H_1$ corresponds to the hypothesis that the author of the test text is a human, $H_2$ corresponds to the hypothesis that the author of a given questioned document is a GenAI-based conversational agent, and y represents the redundancy feature, and wherein a value of BF less than one is used as an indicator that the test text might have been produced by generative artificial intelligence based conversational agent.

The redundancy (y) is computed by measuring the number of repetitions of feature N-grams in the test text.

The feature N-grams comprises one or more of words, word N-Grams, pattern N-grams of characters, word length N-grams, and punctuation N-grams, wherein N represent an integer such as 2, 3, 4, 5 or more.

The support of said stylometric features related to the corresponding Bayes factor value is defined according to predetermined scale comprising the levels "weak", "moderate", "moderately strong", "strong", "very strong" and "extremely strong".

The method further comprises the step of selecting the most representative feature N-grams, such as the 20% most representation feature N-grams, said most representative feature N-grams being of rare or of moderate usage.

The method further comprises a classification step wherein a first decision (d1) is taken for a test text considered as written by a human being and a second decision (d2) is taken for a test text considered generated by a generative artificial intelligence based conversational agent, wherein a loss parameter (l1, l2) represents the loss incurred when one of the first (d1) or second (d2) decision is false, and wherein the first (d1) and second (d2) decisions are taken so as to minimize the loss.

The probability of hypothesis H1 (Pr(H1) can be equal to the probability of the hypothesis (H2) and the loss function l1 can be equal to the loss function l2.

The probability of hypothesis H1 (Pr(H1) can differs from the probability of the hypothesis (H2) and/or the loss function l1 can differ from the loss function l2 so as to consider more severely a falsely classified text generated by a generative artificial intelligence based conversational agent, than a falsely classified text written by a human being.

l2=T×l1 so that falsely classifying a text as written by an artificial intelligence is considered T times as serious as the opposite, wherein T denotes an integer such as 5, 10 or 20

The further comprises measuring the variability of stylometric features within said test text, using this variability, in combination with said feature representing the redundancy of the test text, for determining if the test text has been produced by a human or by a generative artificial intelligence based conversational agent.

The reference texts are grouped in a first cluster (X) related to stylometric features frequently used in a first style of text and rarely used in the second style of text, or in a second cluster (Y) related to stylometric features frequently used in the second style of text and rarely used in the first one.

The relevant stylometric features of a test text are evaluated so that the test text can be considered as being part of a first cluster (X), corresponding to a human text, or a second cluster (Y) generated from a generative artificial intelligence based conversational agent.

The accuracy of the analysis is defined according to the closest neighbour.

Each sequence of test text and reference text is represented on a histogram by a coloured bar, each sequence of test text and reference text is compared to texts of reference style, and represented in a multidimensional space wherein each dimension relates to the frequency of a given stylometric feature.

Each of said colours refers to a reference style.

The size of each of said bars is proportional to the normalised distance of the text to the barycenter of the closest reference texts.

The method further comprises a step of accuracy of the calibration based on comparison with closest neighbours.

A text having an homogenous style, shows an accuracy of more than 90%, or more than 95% or more than 97%, and a text combining several known styles shows a lower accuracy.

Any stylometric feature and analysis is validated by a Bayesian process.

The invention claimed is:

1. A computer implemented method for determining if a test text has been produced by a human or by a generative artificial intelligence based conversational agent, comprising the step of:

retrieving from the test text a feature (y) representing the redundancy of the test text;

using this feature for determining if the test text has been produced by a human or by a generative artificial intelligence based conversational agent, wherein the method comprises the step of computing a Bayes factor (BF)

$$BF = \frac{f(y \mid H_1)}{f(y \mid H_2)},$$

where $H_1$ corresponds to the hypothesis that the author of the test text is a human, $H_2$ corresponds to the hypothesis that the author of a given questioned document is a GenAI-based conversational agent, and y represents the redundancy feature, and wherein a value of BF less than one is used as an indicator that the test text might have been produced by generative artificial intelligence based conversational agent.

2. The method of claim 1, wherein said redundancy (y) is computed by measuring the number of repetitions of feature N-grams in the test text.

3. The method of claim 2, said feature N-grams comprising one or more of words, word N-Grams, pattern N-grams of characters, word length N-grams, and punctuation N-grams, wherein N represent an integer such as 2, 3, 4, 5 or more.

4. The method according to claim 1, wherein support of said stylometric features related to the corresponding Bayes factor value is defined according to predetermined scale comprising the levels "weak", "moderate", "moderately strong", "strong", "very strong" and "extremely strong".

5. The method according to claim 1, further comprising the step of selecting the most representative feature N-grams, such as the 20% most representation feature N-grams, said most representative feature N-grams being of rare or of moderate usage.

6. The method according to claim 1, further comprising a classification step wherein a first decision (d1) is taken for a test text considered as written by a human being and a second decision (d2) is taken for a test text considered generated by a generative artificial intelligence based conversational agent, wherein a loss parameter (l1, l2) represents the loss incurred when one of the first (d1) or second (d2) decision is false, and wherein the first (d1) and second (d2) decisions are taken so as to minimize the loss.

7. The method according to claim 6, wherein the probability of hypothesis H1 (Pr(H1)) equals the probability of the hypothesis (H2) and wherein the loss function l1 equals the loss function l2.

8. The method according to claim 6, wherein the probability of hypothesis H1 (Pr(H1)) differs from the probability of the hypothesis (H2) and/or wherein the loss function 11 differs from the loss function 12 so as to consider more severely a falsely classified text generated by a generative artificial intelligence based conversational agent, than a falsely classified text written by a human being.

9. The method according to claim 8, wherein l2=T×l1 so that falsely classifying a text as written by an artificial intelligence is considered T times as serious as the opposite, wherein T denotes an integer such as 5, 10 or 20.

10. The method according to claim 1, further comprising measuring the variability of stylometric features within said test text, using this variability, in combination with said feature representing the redundancy of the test text, for determining if the test text has been produced by a human or by a generative artificial intelligence based conversational agent.

11. The method according to claim 10, wherein reference texts are grouped in a first cluster (X) related to stylometric features frequently used in a first style of text and rarely used in the second style of text, or in a second cluster (Y) related to stylometric features frequently used in the second style of text and rarely used in the first one.

12. The method according to claim 11, wherein relevant stylometric features of a test text are evaluated so that the test text can be considered as being part of a first cluster (X), corresponding to a human text, or a second cluster (Y) generated from a generative artificial intelligence based conversational agent.

13. Method of claim 10, wherein the accuracy of the analysis is defined according the closest neighbour.

14. Method according to claim 1, wherein each sequence of test text and reference text is represented on a histogram by a coloured bar, each sequence of test text and reference text is compared to texts of reference style, and represented in a multidimensional space wherein each dimension relates to the frequency of a given stylometric feature, wherein each of said colours refers to a reference style.

15. Method according to claim 13, wherein the size of each of said bars is proportional to the normalised distance of the text to the barycenter of the closest reference texts.

16. The method according to claim 14, further comprising a step of accuracy of the calibration based on comparison with closest neighbours.

17. The method according to claim 13, wherein a text having an homogenous style, shows an accuracy of more than 90%, or more than 95% or more than 97%, and a text combining several known styles shows a lower accuracy.

18. Method according to claim 1, wherein any stylometric feature and analysis is validated by a Bayesian process.

* * * * *